United States Patent [19]
Hasley et al.

[11] 3,737,756
[45] June 5, 1973

[54] CONVERTER CIRCUIT WITH BALANCED PARALLEL SWITCHING PATHS

[75] Inventors: Andrew Daniel Hasley, Basking Ridge; Richard Howard Hock, Landing, both of N.J.

[73] Assignee: Bell Telephone Laboratories, Incorporated, Murray Hill, N.J.

[22] Filed: May 15, 1972

[21] Appl. No.: 253,502

[52] U.S. Cl. .......................321/2, 321/18, 321/27, 323/17, 323/22 T, 323/DIG. 1, 331/113 A
[51] Int. Cl. .........................H02m 3/14, G05f 1/58
[58] Field of Search.....................321/2, 18, 26, 27; 323/17, 22 T, DIG. 1; 331/113 A

[56] References Cited

UNITED STATES PATENTS

| | | | |
|---|---|---|---|
| 3,289,067 | 11/1966 | Pinckaers | 321/2 |
| 3,350,661 | 10/1967 | Bloom et al. | 331/113 |
| 3,443,194 | 5/1969 | Cielo | 323/DIG. 1 |
| 3,514,692 | 5/1970 | Lingle | 323/22 T |
| 3,663,941 | 5/1972 | Pasciutti | 321/2 |

Primary Examiner—Gerald Goldberg
Attorney—W. L. Keefauver

[57] ABSTRACT

A single ended converter includes a differential transformer arrangement to constrain paralleled switching transistors to operate with equal current loads. The differential transformer has magnetically coupled windings in the output and the base drive circuits in each of the switching transistors. If the switching transistors conduct unequal currents, flux is produced in the differential transformer which generates base drive signals to restore equal current loads in the paralleled switching transistors. The output voltage is regulated by a feedback circuit which controls the switching of the paralleled switching devices. The feedback circuit operates in a pseudo-random fashion and hence switches the transistors at varying frequencies and varying duty cycles. This advantageously reduces the acoustic noise of the converter.

8 Claims, 2 Drawing Figures

CONVERTER CIRCUIT WITH BALANCED PARALLEL SWITCHING PATHS

BACKGROUND OF THE INVENTION

This invention relates to converter circuits and, in particular, to single ended converter circuits. It is specifically concerned with the balancing of the current loads in paralleled switching paths in a single ended converter.

Single ended converter circuits utilize one or more switching devices operating in phase with each other to convert DC to AC so that a transformer may be used to change the voltage level of a signal. The switching device generally connects a DC voltage source to a power transformer. The switching device is periodically switched to intermittently couple the voltage source to the primary winding of the converter power transformer.

A load to be energized is coupled to the secondary winding of the converter power transformer. Generally a rectifier diode is connected in the secondary winding of the converter power transformer. This diode is poled to be open when the switching device of the converter is conducting. When the switching device is nonconducting, the rectifier diode is forward biased and releases energy stored in the core of the converter power transformer.

The normal single ended converter utilizes a single switching device which must handle all of the input (or primary) current of the converter circuit. This current has a high peak value since the input current waveshape is a sawtooth waveform. The current load of the switching device may be reduced by connecting several switching devices in parallel. The characteristics of these switching devices must be carefully matched, however, so that they share the load current equally. If the paralleled switching devices are operated independently of each other, one device may conduct a current load greatly in excess of the other. This may be partially alleviated by applying each switching device to a separate transformer core. This solution, however, is very cumbersome and greatly increases the leakage inductance of the converter circuit.

It is, therefore, an object of the invention to accommodate high peak currents in a single ended converter more efficiently.

It is another object of the invention to equally utilize paralleled switching paths in a single ended converter without the necessity of carefully matching the characteristics of the switching devices.

It is yet another object of the invention to utilize a plurality of switching devices connected to a single core of the converter power transformer.

SUMMARY OF THE INVENTION

Therefore, in accord with the invention, a single ended converter circuit utilizes two paralleled switching devices to energize a single primary winding of a flyback transformer having a single transformer core. A differential transformer is connected in the current paths of the two paralleled switching devices to constrain them to operate in parallel with equal current loads and identical turnoff times. The differential transformer magnetically couples the base drive and collector outputs of the paralleled switching transistors which comprise the switching devices. In the specific case of two paralleled switching transistors two windings of this differential transformer connect the collectors of the two switching transistors together. The junction of these two windings is connected to the primary winding of the converter flyback transformer. Two auxiliary windings on the differential transformer are connected in the base drive paths of the switching transistors. These auxiliary windings are magnetically coupled to the two collector windings of the differential transformer. If the transistor currents are equal, the windings are oriented so that no flux exists in the magnetic core of the differential transformer. If, however, these currents are different, a flux differential is generated which restores the equality of current in the transistors by changing their relative conductivity.

The converter circuit includes a voltage regulation feedback circuit which regulates the converter output by disabling the switching drive to the switching transistors. This regulation feedback circuit inherently operates in a pseudo-random fashion and hence operates the switching devices at a varying frequency. This arrangement advantageously generates a simulated random noise and hence reduces the acoustic noise of the converter.

BRIEF DESCRIPTION OF THE DRAWINGS

Many additional advantages, features and objects of the invention may be readily ascertained by reference to the foregoing specification and to the drawings in which.

DETAILED DESCRIPTION

Figure 1:
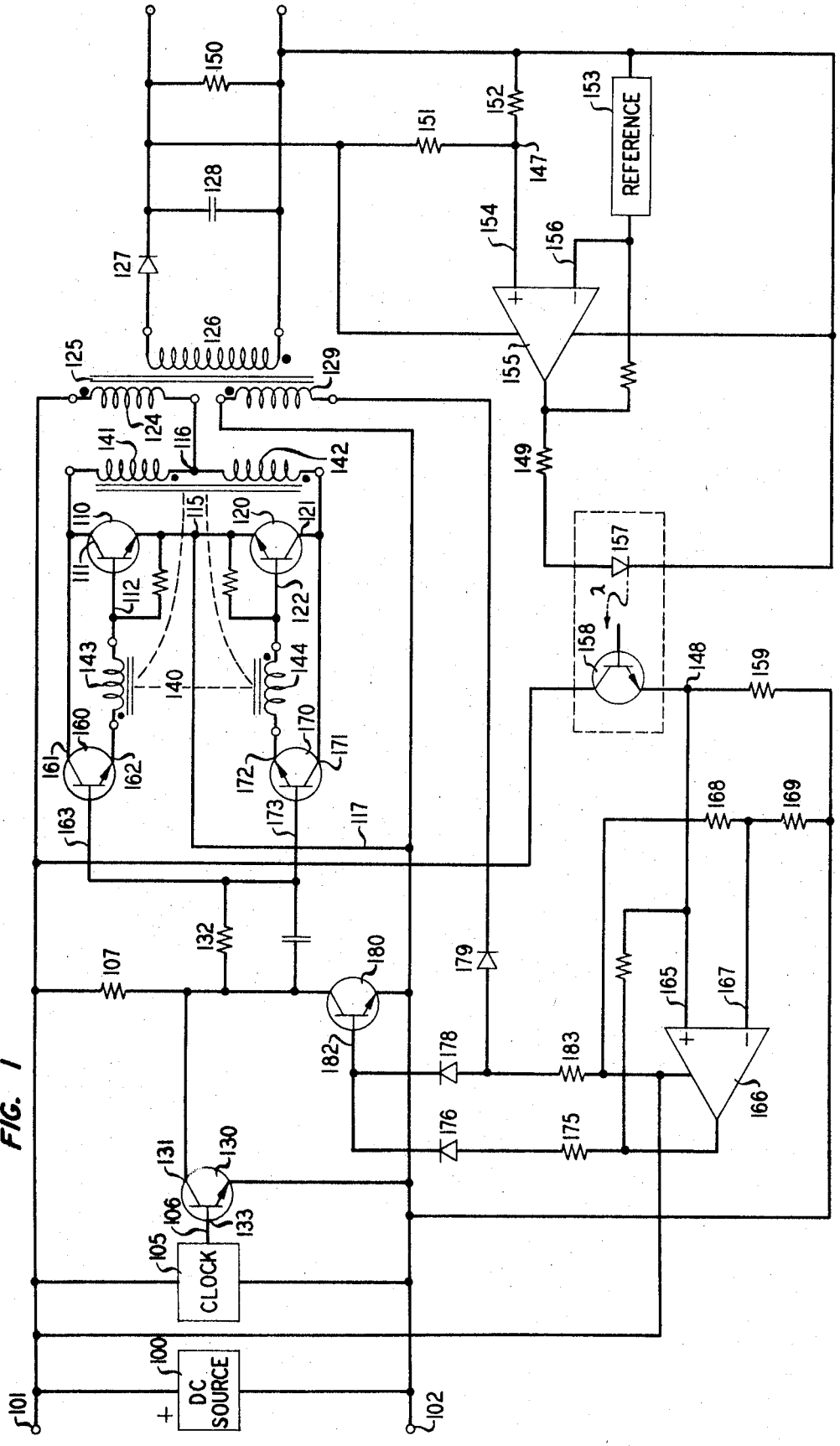
FIG. 1 is a schematic of a single ended converter circuit with balanced paralleled switching paths.

The single ended converter circuit shown in FIG. 1 shows two paralleled switching devices interconnected with a differential transformer which constrains them to conduct with equal current loads. A DC voltage source 100 is coupled to the input terminals 101 and 102. The DC voltage source 100 is coupled by the switching transistors 110 and 120 to the primary winding 124 of the converter power transformer 125. The secondary winding 126 of the converter transformer 125 is coupled to the load 150. The input terminal 101 is directly coupled to the primary winding 124 of the transformer 125. The other side of the primary winding 124 is connected to the junction 116 of the two windings 141 and 142 of a differential transformer 140. The winding 141 is connected to the collector 111 of the switching transistor 110. The winding 142 is connected to the collector 121 of the switching transistor 120. The current flowing through the primary winding 124 flows in parallel through the collector-emitter paths of the transistors 110 and 120 to the common emitter junction 115 which is connected to the neutral return wire 117. The neutral return wire 117 is connected to the input terminal 102.

The switching of the transistors 110 and 120 is controlled in an unregulated fashion in response to a periodic pulse output of the clock source 105. A feedback regulation circuit to be discussed hereinbelow regulates by overriding the unregulated control of the clock source 105. The clock source 105 is connected across the input terminals 101 and 102 and is energized by the input voltage source 100. The clock source 105 may comprise any stable frequency astable circuit and need not be described in detail.

The output of the clock source 105 is connected, via lead 106, to the base electrode 133 of transistor 130. The collector 131 of transistor 130 is coupled, via resistor 132, to the base electrodes 163 and 173 of the driving transistors 160 and 170. The collectors 161 and 171 of these driving transistors are connected to the collectors 111 and 121, respectively, of the switching transistors 110 and 120. The emitter 162 of transistor 160 is coupled, via a differential transformer winding 143 to the base 112 of the switching transistor 110. The emitter 172 of transistor 170 is coupled, via the differential transformer winding 144, to the base 122 of transistor 120.

It is apparent from the foregoing description that the clock source 105 controls the switching of the switching transistors by driving the transistor 130 into alternate conducting and nonconducting states. If transistor 130 is conducting, the input energizing signal from lead 101 is directed through resistor 107 and transistor 130 to the neutral input terminal 102. If transistor 130 is nonconducting, the signal traversing resistor 107 is transmitted, via the resistor 132, to the base electrodes 163 and 173 of the driving transistors 160 and 170.

The differential transformer 140, as described hereinabove, has four windings 141, 142, 143 and 144 wound on a single magnetic core. Two windings 141 and 142 are connected to the collectors 111 and 121 of the switching transistors 110 and 120, respectively. The other two windings 143 and 144 are connected in the base input drives of these two switching transistors. The windings 141, 142, 143 and 144 are mutually magnetically coupled as indicated in FIG. 1, by the dot notation. The dot notation is well known to those skilled in the art and it is not believed necessary to describe its meaning herein.

The windings 141, 142, 143 and 144, as indicated by the dot notation, are oriented so that no flux exists in the magnetic core of the differential transformer as long as the collector-emitter currents in the switching transistors 110 and 120 are equal. If, however, the current on one of the switching transistors exceeds the current in the other, a flux differential is generated which restores the equality of the current conducted in the two switching transistors 110 and 120 by altering their relative conductivity. For example, if the current load in the transistor 110 increases and exceeds the current load in the transistor 120, the current in the winding 141 exceeds the current in the winding 142. Due to this increased current in winding 141, a voltage is induced in the winding 143 to counteract the base drive signal applied to the base 112 of the transistor 110. A voltage is also induced in the winding 144 to enhance the base drive signal applied to the base 122 of transistor 120. Hence it is apparent that the current load in transistor 110 will decrease and the current load in transistor 120 will increase until equality of the two current loads is achieved.

The secondary winding 126 of the converter transformer 125 is connected to a rectifier or flyback diode 127. When the transistors 110 and 120 are conducting, the diode 127 is reverse biased. Hence no current can flow in the secondary winding 126 and the input energy is stored in the core of the converter transformer 125. When the transistors 110 and 120 cease conducting, the induced voltage in the secondary winding 126 reverses and forward biases the diode 127. This enables current to flow to the output load 150 and discharge the stored energy in the core of the converter transformer 125. A filter capacitor 128 is shunted across the output load to reduce the ripple of the rectified signal.

The converter transformer 125 includes a third tertiary winding 129 which is utilized as described hereinbelow to sense the voltage polarity on the secondary winding 126. The winding 129 supplies a signal which is utilized to block conduction in the transistors 110 and 120 when the diode 127 is forward biased.

The voltage output of the converter is regulated by sensing the output voltage and comparing it to a reference voltage. An error signal is generated and utilized to inhibit the clock source 105 from controlling the switching transistors 110 and 120. The output voltage of the converter is sensed, via a voltage divider, comprising the series-connected resistors 151 and 152. The voltage divider is shunted across the output load 150. The junction 147 of resistors 151 and 152 is connected to an input terminal 154 of a difference amplifier 155. The voltage at junction 147 is directly proportional to the output voltage. A reference voltage supplied by the reference voltage source 153 is applied to the other input terminal 156 of the difference amplifier 155. The output of the difference amplifier 155 is a voltage which is linearly proportional to the relative proportions of the output voltage and the reference voltage.

The output voltage of the difference amplifier 155 is applied, via the resistor 149, to a light emitting diode 157. The light emitting diode 157 generates an optical signal whose illumination intensity is proportional to the current magnitude flowing therethrough. The light emitting diode 157 is optically coupled to a phototransistor 158 and controls its conductivity. The light emitting diode 157 and phototransistor 158 may comprise a single device package. Such devices are well known in the art and need not be described in detail. The optical coupling advantageously isolates the input and output portions of the converter circuit in the feedback loop.

The current flow in the light emitting diode 157 induces a proportional current flow in the phototransistor 158. The phototransistor 158 has its collector-emitter path connected in series between the positive terminal 101 of the voltage source 100 and the resistor 159 which is coupled to the neutral return terminal 102. The junction 148 of the phototransistor 158 and the resistor 159 is connected to an input terminal 165, of a bistable comparator amplifier 166. A second voltage taken from the junction of resistors 168 and 169 is connected to the other input terminal 167 of the comparator amplifier. The comparator amplifier 166 is operated in the bistable mode producing a high level output signal when the voltage on lead 165 exceeds the voltage on lead 167 and a low level output signal when the voltage on lead 167 exceeds the voltage on lead 165.

The output of the comparator 166 is coupled, via the resistor 175 and the diode 176, to the base electrode 182 of the transistor 180. If the output of the comparator amplifier 166 is high, it drives the transistor 180 into its conducting state. When the transistor 180 is conducting it diverts the base drive signals supplied by the clock 105 from the transistors 160 and 170 to the neutral input terminal 102 and hence causes transistors 110 and 120 to be biased nonconducting. Hence as long as the converter output voltage exceeds its regulated value, the switching transistors 110 and 120 will remain nonconducting.

As indicated hereinabove the voltage across the transformer winding 129 is utilized to bias the switching transistors 110 and 120 nonconducting when the flyback diode 127 is conducting. When the flyback diode is conducting the voltage across the transformer winding 129 reverse biases the diode 179. The input voltage at terminal 101 is applied, via diode 178 and resistor 183, to the base 182 causing the transistor 180 to conduct and thereby bias transistors 110 and 120 nonconducting during the conduction periods of the flyback diode 127. Hence the nonconductivity of transistors 110 and 120 is guaranteed when the energy stored in the core of the converter transformer 125 is being discharged into the output load 150.

It is apparent from the foregoing description that as long as the output voltage exceeds its regulated value, the feedback circuit will operate to prevent the switching transistors 110 and 120 from conducting. In addition, the comparator amplifier 166 may permit the switching transistors 110 and 120 to conduct after the clock source 105 has begun its cycle. Hence, depending on the stability of the output voltage, the switching transistors 110 and 120 may skip switching for a period equal to several complete cycles of operation of the clock source 105 or operate with varying duty cycles. Hence, the switching will operate at varying frequencies with varying duty cycles and will switch in a pseudo-random manner. This will advantageously generate a simulated random noise and reduce the acoustic noise generated by the converter.

Figure 2:
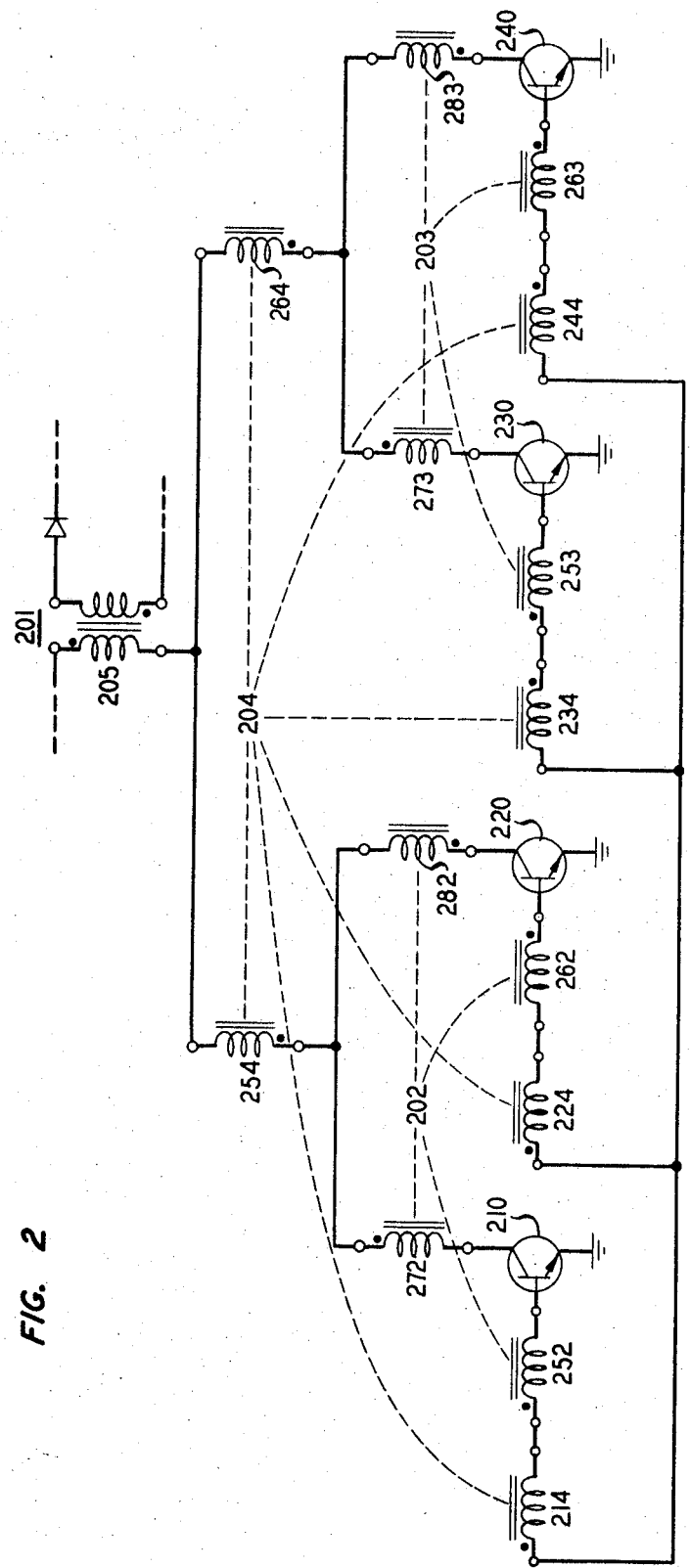
FIG. 2 is a schematic to show the circuit arrangement to balance a plurality of paralleled switching paths.

The switching arrangement shown in FIG. 2 discloses a differential transformer arrangement to balance four paralleled switching transistors in a single ended converter. The four switching transistors 210, 220, 230 and 240 are connected in parallel to the primary winding 205 of the converter power transformer 201. Three differential transformers 202, 203 and 204 each include windings to magnetically couple the base drive and collector current paths to balance the respective current loads in the switching transistors 210, 220, 230 and 240.

The transformer 202 comprises the mutually coupled windings 252, 262, 272 and 282. The transformer 202 functions to balance the current load in the parallel connected switching transistors 210 and 220. The transformer 203 comprises the mutually coupled windings 253, 263, 273 and 283. The transformer 203 functions to balance the current load in the paralleled switching transistors 230 and 240. The transformers 202 and 203 each generate flux signals to correct unbalanced current loads in the same manner as the transformer 140 in FIG. 1. Hence, it is not believed necessary to describe their operation herein. The orientation of the mutual coupling is shown by the dot notation in FIG. 2.

The transformer 204 comprises the windings 214, 224, 234, 244, 254 and 264; each mutually coupled to each other as indicated by the dot notation. The transformer 204 generates no flux if the combined current load in transistors 210 and 220 equals the combined current load in transistors 230 and 240. Should the respective current loads become unbalanced, a flux is generated in transformer 204 which generates induced voltages in the windings to restore the current balance by altering the conductivity of the switching transistors to restore the current load balance. For example, if the current load in transistors 210 and 220 exceeds the current load in transistors 230 and 240, the current excess in winding 254 will generate a flux which will induce a voltage in windings 214 and 224 to reduce the conductivity of transistors 210 and 220 and a voltage in windings 234 and 244 to increase the conductivity of transistors 230 and 240.

It will be readily apparent to those skilled in the art that these techniques may be readily extended to balance the currents in other parallel combinations of transistors without departing from the spirit and scope of the invention.

What is claimed is:

1. A DC to DC converter comprising input terminals, a converter power transformer and output terminals, first and second switching devices connected in parallel and coupling said input terminals to said converter power transformer, means to switch said switching devices and means to balance the respective current loads flowing in said switching devices, said means to balance comprising a differential transformer including first and second windings in the main conduction paths of said first and second switching devices, respectively, and third and fourth windings coupling said means to switch to said first and second switching devices, respectively, said first, second, third and fourth windings being magnetically coupled to each other by being wound on a common flux path device, said first and second windings oriented to generate opposing fluxes, said third and fourth windings oriented to generate opposing fluxes and said first and third and second and fourth windings oriented to generate summing fluxes, respectively, whereby the induced voltages due to flux in said common flux path constrain the switching devices to operate with equal current loads.

2. A DC to DC converter as defined in claim 1 wherein said means to switch comprises a periodic pulse source and means to apply pulses of said periodic pulse source to said switching devices, feedback means to regulate the voltage across the output terminals of said converter and means responsive to said feedback means to inhibit the transmission of signals through said means to apply.

3. A DC to DC converter as defined in claim 2 wherein said converter power transformer includes a primary winding, a secondary winding and a tertiary winding, a rectifier diode to connect said secondary winding to said output terminals, a second diode coupling said tertiary winding to said means to inhibit and poled to conduct when said rectifier diode is conducting in order to inhibit said switching devices when said rectifier diode is conducting.

4. A DC to DC converter as defined in claim 3 wherein said feedback means comprises means to compare the voltage at said output terminal with a reference voltage, means to generate an error signal therefrom, means to generate an optical signal in response to said error signal, optically responsive means to generate a voltage, bistable means to compare the voltage generated by said optically responsive means with a second voltage and means to utilize the output of said bistable means to compare to activate said means to inhibit the transmission of signals through said means to apply.

5. A power supply circuit including at least two paralleled switching transistors switching in phase with each other, a current balance control circuit to equalize current loads in at least two of said paralleled switching transistors comprising a first and a second switching transistors, a magnetic medium, a first and a second winding connected in series with the main conduction path of said first and second switching transistors respectively, a third and fourth winding connected to the control electrodes of said first and second switching transistors, respectively, said first, second, third and fourth windings oriented on said magnetic medium so that a current difference in said first and second windings induces signals in said third and fourth windings which alter the conductivity of said first and second switching transistors to eliminate said differences.

6. A circuit as defined in claim 5 further including a converter power transformer, signal regulation circuitry and a periodic pulse source connected to drive said paralleled switching transistors, means responsive to said signal regulation circuitry to disrupt the connection of said periodic pulse source to drive said paralleled switching transistor.

7. A circuit as defined in claim 6 further including output terminals and a rectifying diode to connect said transformer to said output terminals, said transformer including a tertiary winding and means responsive to the signal on said tertiary winding to activate said means to disrupt.

8. A circuit as defined in claim 5 further including third and fourth switching transistors respectively, a second magnetic medium, said fifth, sixth, seventh and eighth windings oriented on said second magnetic medium so that a current difference in said fifth and sixth windings induces signals in said seventh and eighth windings which alter the conductivity of said third and fourth switching transistors to eliminate said differences in said fifth and sixth windings and third means to balance the current load in said first and second transistors with the current load in said third and fourth transistors including a third magnetic medium, ninth and tenth windings to sense the current load in said first and second transistors and said third and fourth transistors and bias windings coupled to each of said transistors, said ninth, tenth and bias windings being wound on said third magnetic medium.

* * * * *